(No Model.)
L. C. CUMMINS.
DUPLEX TELESCOPE RIFLE SIGHT.
No. 499,160. Patented June 6, 1893.
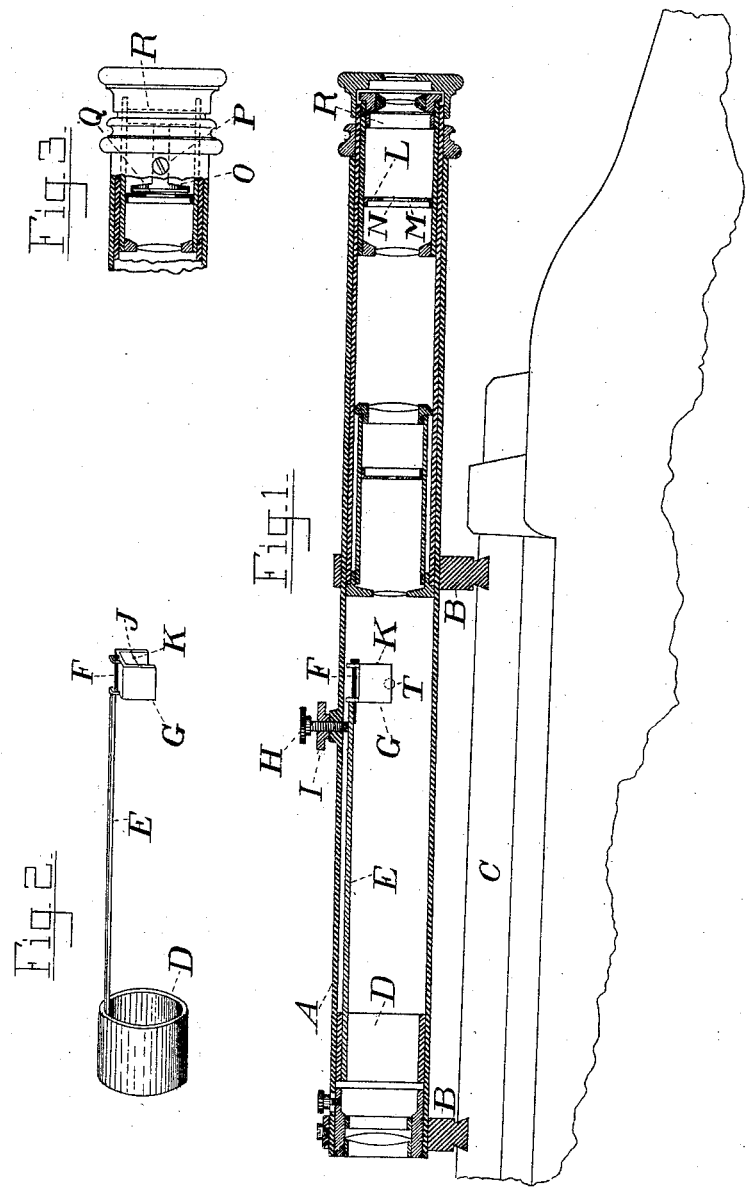
Witnesses:
E. R. Plansted
A. J. Eaton
Inventor
Lawson Cutter Cummins

UNITED STATES PATENT OFFICE.

LAWSON CUTLER CUMMINS, OF MONTPELIER, VERMONT.

DUPLEX TELESCOPE RIFLE-SIGHT.

SPECIFICATION forming part of Letters Patent No. 499,160, dated June 6, 1893.

Application filed June 24, 1892. Renewed May 12, 1893. Serial No. 474,033. (No model.)

*To all whom it may concern:*

Be it known that I, LAWSON CUTLER CUMMINS, a citizen of the United States, residing at Montpelier, in the county of Washington and State of Vermont, have invented a new and useful Duplex Telescope Rifle-Sight, of which the following is a specification.

My invention relates to improvements in telescope sights for rifles; and the object of my improvements is to provide sights that while aligned with the target shall enable the marksman to point the bore of the rifle at or above or to the right or left of the target and at all times show through the lens of the telescope to what point the bore of the rifle is aimed. I attain this object by the mechanism illustrated in the accompanying drawings, in which is represented, by—

Figure 1 a vertical section of telescope fitted with this improvement; Fig. 2, a perspective view of the forward section of the sight; Fig. 3, the rear section fixed in position in the eye piece of the telescope.

Similar letters refer to similar parts throughout the several views.

The telescope A is rigidly attached to the rifle barrel C by the rings with dovetailed bases B B. To the inside of the collar D and extending longitudinally with the same is attached a spring E. At its outer end is a pivot F upon which is pivoted a bifurcated pendulum G. The arms of this pendulum are connected with a fiber of silk J. Upon this fiber of silk and midway between the two arms which it connects is placed a small globe of balsam or other suitable material K. This section of the sight is so placed in the telescope that the fiber of silk is in the forward focus. The point of the thumb screw H acts directly upon the spring E. The thumb screw H is supplied with a check nut I.

In Fig. 3 is shown the rear section of the sight in position. It consists of a collar R to the inside of which and extending longitudinally therewith is attached a spring which is bifurcated at O each branch extending in an arc parallel to that of the collar R ninety degrees where the points are slightly turned outward as shown in the drawings. These points are connected by a fiber of silk colored black which when the sight is in place is in a vertical position. The screw P acts directly upon the spring O.

A fiber of silk M colored gray is drawn vertically through the center of the orifice of the diaphragm L at the rear focus of the telescope. Upon this fiber of silk and slightly above its center is placed a small globe of balsam or other suitable material N. The screw P is threaded in the telescope tube with its point resting against the spring O. By means of the screw P and collar R the silk fiber Q is adjusted as desired. The fiber M is placed in accordance with a plumb line in front of telescope and the fiber Q placed in conjunction with the fiber M in the rear focus of the telescope. The forward section of the sight Fig. 2 is now placed in the tube of the telescope A so that the fiber of silk J is in the forward focus and by means of the collar D and thumb screw H adjusted so that the globe K is obscured by the globe N both being the same size. The telescope is attached to the rifle barrel in such a manner that this line of sight from the globe N is parallel to the bore of the rifle. A set screw in the telescope tube A on each side of the pendulum G, one of which is shown at T, prevents its excessive vibration.

I am aware that prior to this invention rifle telescopes have been constructed with an adjustable sight supplied with a pendulum plumb indicator in combination with a fixed sight. I therefore do not claim such a combination broadly; but What I do claim, and desire to secure by Letters Patent, is—

1. The combination in a rifle telescope, of the forward sight section, provided with a longitudinal spring suitably secured at one end and provided at its other end with a bifurcated pendulum, the arms of which pendulum are connected by a suitable fiber, and a globe secured to said fiber, substantially as described.

2. The combination in a rifle telescope, of the forward sight section provided with a suitable collar near its outer end, to the inside of which is secured a longitudinal spring, the other end of said spring having pivoted thereto a bifurcated pendulum, the arms of which pendulum are connected by a silk fiber to which is attached a suitable globe and the thumb screw for adjusting the position of the spring, substantially as described.

3. The combination in a rifle telescope, of the rear sight section, which consists of a suitable collar provided in the eye-piece of the telescope, to which collar is attached a suitably-bifurcated spring, whose arms are connected by a suitable fiber, the fixed fiber provided with a globe thereon and the screw for adjusting the position of the same, substantially as described.

4. The herein-described rifle telescope sight, consisting of the front section sight, provided with a suitable collar to which one end of a longitudinal spring is attached, the other end of said spring being provided with a bifurcated pendulum suitably pivoted thereto, whose arms are connected by a silk fiber provided with a globe and adjusted by a thumb screw, and the rear section sight provided with a suitable collar having a spring secured thereto, said spring having bifurcated arms connected by a fiber of silk, the fixed silk fiber having secured thereon a globe and the screw for adjusting the same, substantially as described.

5. The herein-described rifle telescope sight, consisting of the front section sight, provided with a collar D, having attached thereto the longitudinal spring E, which spring has pivoted thereto at its other end the bifurcated pendulum G, the arms of the pendulum being connected by a fiber of silk and provided with the globe K, the thumb screw H for adjusting said pendulum, and the rear section sight provided with the collar R having the bifurcated spring O secured thereto, the arms of the said bifurcated spring being provided with a silk fiber, the fixed silk fiber M to which is attached a globe, and the screw P for adjusting said spring, substantially as described.

LAWSON CUTLER CUMMINS.

Witnesses:
  A. G. EATON,
  A. C. HARLOW.